(12) United States Patent
Fushihara et al.

(10) Patent No.: US 8,426,526 B2
(45) Date of Patent: Apr. 23, 2013

(54) SOLID GOLF BALL

(75) Inventors: Kazuhisa Fushihara, Kobe (JP); Yumi Kanemitsu, Kobe (JP)

(73) Assignee: SRI Sports Limited, Kobe (JP)

( * ) Notice: Subject to any disclaimer, the term of this patent is extended or adjusted under 35 U.S.C. 154(b) by 269 days.

(21) Appl. No.: 12/878,108

(22) Filed: Sep. 9, 2010

(65) Prior Publication Data

US 2011/0086727 A1   Apr. 14, 2011

(30) Foreign Application Priority Data

Oct. 13, 2009   (JP) ................. 2009-236562

(51) Int. Cl.
- *A63B 37/06* (2006.01)
- *A63B 37/00* (2006.01)
- *C08L 9/00* (2006.01)
- *C08K 5/375* (2006.01)

(52) U.S. Cl.
USPC ..... 525/261; 525/274; 525/332.4; 525/332.6; 525/345; 473/371; 473/377

(58) Field of Classification Search .......... None
See application file for complete search history.

(56) References Cited

U.S. PATENT DOCUMENTS

| | | | | |
|---|---|---|---|---|
| 4,340,695 | A * | 7/1982 | Schubart et al. | 525/350 |
| 2001/0053808 | A1 * | 12/2001 | Kataoka | 524/394 |
| 2003/0050136 | A1 | 3/2003 | Mano et al. | |
| 2003/0114246 | A1 * | 6/2003 | Yokota | 473/351 |

FOREIGN PATENT DOCUMENTS

| | | | |
|---|---|---|---|
| JP | 2001-340497 A | | 12/2001 |
| JP | 2002000763 | * | 1/2002 |
| JP | 2002-224244 A | | 8/2002 |
| JP | 3554526 B2 | | 5/2004 |

OTHER PUBLICATIONS

Office Action dated Jul. 12, 2011 for Japanese Application No. 2009-236562.

* cited by examiner

*Primary Examiner* — David Buttner
(74) *Attorney, Agent, or Firm* — Birch, Stewart, Kolasch & Birch, LLP

(57) ABSTRACT

The present invention provides a solid golf ball that exhibits a high resilience performance and a high flight performance and gives a good shot feeling. The present invention relates to a solid golf ball including:
  a core including at least one layer; and
  a cover including at least one layer, the cover being provided to cover the core,
  wherein the at least one layer of the core is prepared by vulcanization-molding a rubber composition including:
  (a) a base rubber;
  (b) a co-crosslinking agent;
  (c) an organic peroxide;
  (d) a filler; and
  (e) a disulfide compound represented by formula (I):

$$R^1-S-S-R^2 \qquad (I)$$

wherein $R^1$ and $R^2$ each represent any one of the following groups: an aromatic hydrocarbon group; an aliphatic hydrocarbon group having two or more carbon atoms; a heterocyclic hydrocarbon group; and an alicyclic hydrocarbon group, each of which is optionally substituted, and
$R^1$ is a group different from $R^2$.

3 Claims, 1 Drawing Sheet

SOLID GOLF BALL

TECHNICAL FIELD

The present invention relates to a solid golf ball.

BACKGROUND ART

Solid golf balls, which are excellent in durability and flight distance, have been known as a golf ball. The solid golf balls include a two-piece golf ball having a core and a cover covering the core, and a multi-layered golf ball having at least one intermediate layer between a core and a cover. As a rubber material used for the core of the solid golf balls, there has been widely employed a product prepared by vulcanization-molding a rubber composition that includes: a metal salt of α,β-unsaturated carboxylic acid (co-crosslinking agent) such as zinc acrylate; an organic peroxide, and the like, in addition to a high-cis polybutadiene (BR) as a base rubber, from the viewpoint of stressing the property of resilience.

It is known that the resilience performance can be improved by adding to such a rubber composition an organic sulfur compound (disulfide type (SS), thiol type (SH)) in a very small amount. Some golf balls having an organic sulfur compound-containing core have been already put into practical use. However, details about the mechanism for enabling the performance improvement have not been proven yet.

Patent Document 1 discloses, as the thiol or disulfide type organic sulfur compound, a compound that contains a benzene ring having a substituent, in which the substituent is numerically specified by the substituent constant indicating the electronegativity. It is also shown that compounds with larger substituent constants generally tend to give a higher resilience to golf balls. In Patent Document 1, however, only symmetric compounds (compounds including two identical aromatic hydrocarbon groups each bonded to the S atom of the disulfide) such as bis(2,3,5,6-tetraacetylphenyl)disulfide and bis(pentabromophenyl)disulfide are substantially disclosed as the disulfide compound. Further, a further improvement in resilience performance is also desired.

The resilience performance of the golf balls can be improved by increasing the amount of a sulfur compound to be added within a certain range. However, the use of the sulfur compound above a certain amount tends to adversely cause deterioration of the resilience performance, and also cause decrease in hardness of the golf balls to make it difficult to adjust the hardness, which influences the performance of the golf balls. The hardness can be adjusted (increased), usually by increasing the amount of an initiator or a co-crosslinking agent. However, the hardness adjustment by increasing the initiator amount has limitations, and that by increasing the co-crosslinking agent amount also has limitations because deterioration of the resilience performance tends to be caused.

Further, attempts to improve the resilience performance using a mixture of a plurality of sulfur compounds have been made, but in fact the physical properties derived from the compounds are often poorly exhibited. For example, in use of a mixture of chlorobenzenethiol (with one substituent) and pentachlorobenzenethiol (with five substituents), the resilience performance is slightly lower than the average of the two compounds, and as a result, the effects of the mixing fail to be exhibited.

As mentioned above, it is difficult to provide a golf ball having a further improved resilience performance (flight performance) while attaining a hardness needed for a golf ball even when the conventional organic sulfur compounds are used for the core. Accordingly, it has been desired to provide a solid golf ball that exhibits a higher resilience performance and gives a good shot feeling.

Patent Document 1: JP 3554526 B2

SUMMARY OF THE INVENTION

The present invention aims to provide a solid golf ball that can solve the aforementioned problems and exhibit a high resilience performance and a high flight performance, and give a good shot feeling.

The present invention relates to a solid golf ball including:
a core including at least one layer; and
a cover including at least one layer, the cover being provided to cover the core,
wherein the at least one layer of the core is prepared by vulcanization-molding a rubber composition,
the rubber composition including:
(a) a base rubber;
(b) a co-crosslinking agent;
(c) an organic peroxide;
(d) a filler; and
(e) a disulfide compound represented by the following formula (I):

$$R^1\text{—}S\text{—}S\text{—}R^2 \quad (I)$$

wherein $R^1$ and $R^2$ each represent any one of the following groups: an aromatic hydrocarbon group; an aliphatic hydrocarbon group having two or more carbon atoms; a heterocyclic hydrocarbon group; and an alicyclic hydrocarbon group, each of which is optionally substituted with a substituent, and $R^1$ is a group different from $R^2$.

In the disulfide compound, it is preferable that $R^1$ is an optionally substituted aromatic hydrocarbon group, $R^2$ is an optionally substituted aliphatic hydrocarbon group having two or more carbon atoms, and $R^1$ is a group different from $R^2$.

It is more preferable that $R^1$ is a substituted aromatic hydrocarbon group, $R^2$ is an optionally substituted aliphatic hydrocarbon group having two or more carbon atoms, and $R^1$ is a group different from $R^2$.

In the disulfide compound, it is preferable that each of $R^1$ and $R^2$ is an optionally substituted aromatic hydrocarbon group, and $R^1$ is a group different from $R^2$.

It is more preferable that each of $R^1$ and $R^2$ is a substituted aromatic hydrocarbon group, and $R^1$ is a group different from $R^2$.

Further, it is preferable that in the disulfide compound, the substituent contains a halogen atom.

The solid golf ball of the present invention is prepared using a specific asymmetric disulfide compound as an additive for materials of the core, and hence the solid golf ball has a desired hardness and also has a further improved resilience performance. Accordingly, the present invention can provide a solid golf ball that exhibits a high resilience performance and a high flight performance and gives a good shot feeling.

BEST MODE FOR CARRYING OUT THE INVENTION

Figure 1:
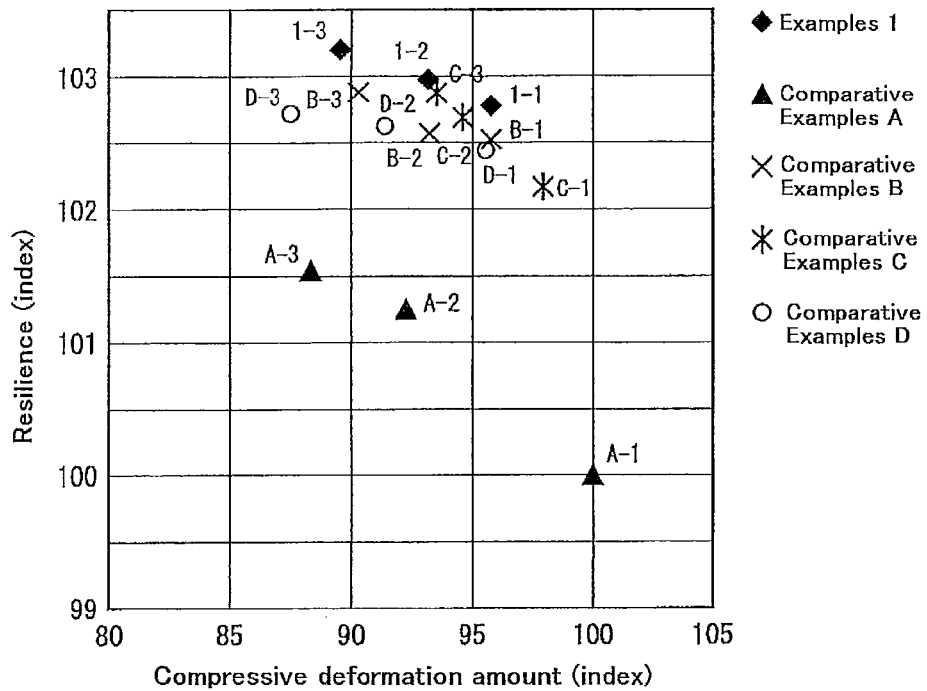
FIG. 1 is a graph showing the relationship between the compressive deformation amount (X-axis) and the coefficient of restitution (Y-axis) of the respective cores for a solid golf ball listed in Tables 2 and 3.

The solid golf ball of the present invention includes a core including at least one layer and a cover including at least one layer, the cover being provided to cover the core, wherein the at least one layer of the core is prepared by vulcanization-molding a rubber composition, the rubber composition including: (a) a base rubber; (b) a co-crosslinking agent; (c) an organic peroxide; (d) a filler; and (e) a disulfide compound represented by the above formula (I).

In the solid golf ball of the present invention, the cover including at least one layer is provided to cover the core including at least one layer. The core is basically prepared by vulcanizing under heat and pressure a rubber composition containing a base rubber, a co-crosslinking agent, an organic peroxide, a filler, a disulfide compound represented by the above formula (I), and the like, using a method and conditions commonly employed for preparation of solid cores.

The base rubber used in the present invention includes, for example, any natural rubber and/or synthetic rubber conventionally used for solid golf balls. Particularly preferable is a so-called high-cis polybutadiene rubber in which the cis-1,4-bond content is at least 40% or more, preferably 80% or more. If needed, a natural rubber, polyisoprene rubber, styrene-polybutadiene rubber, ethylene-propylene-diene rubber (EPDM), and the like may be blended with the polybutadiene rubber.

Examples of the co-crosslinking agent include: α,β-unsaturated carboxylic acids having 3 to 8 carbon atoms such as acrylic acid and methacrylic acid; and monovalent or divalent metal salts thereof such as a zinc salt thereof and a magnesium salt thereof. Among them, zinc acrylate is preferable because it imparts higher resilience to the golf ball. The amount of the co-crosslinking agent to be blended is preferably 15 to 45 parts by mass, and more preferably 20 to 35 parts by mass based on 100 parts by mass of the base rubber. When the amount of the co-crosslinking agent is smaller than 15 parts by mass, the amount of the organic peroxide to be blended needs to be increased for a suitable hardness of the resulting golf ball, and hence the ball may not exhibit high resilience. When the amount is larger than 45 parts by mass, the resulting golf ball may become too hard, and hence may give a poor shot feeling.

The organic peroxide serves as a cross-linking agent or a curing agent. Examples thereof include dicumyl peroxide, 1,1-bis(t-butylperoxy)-3,3,5-trimethylcyclohexane, 2,5-dimethyl-2,5-di(t-butylperoxy)hexane, and di-t-butyl peroxide. Dicumyl peroxide is suitably used. The amount of the organic peroxide to be blended is preferably 0.2 to 5.0 parts by mass, and more preferably 1.0 to 2.5 parts by mass based on 100 parts by mass of the base rubber. When the amount of the organic peroxide is smaller than 0.2 parts by mass, the resulting golf ball may become too soft, and hence may fail to exhibit high resilience. When the amount is larger than 5.0 parts by mass, the amount of the co-crosslinking agent to be blended needs to be decreased for a suitable hardness of the resulting golf ball, and hence the ball may fail to exhibit high resilience. The organic peroxide is thermally decomposed to generate radicals and increase the crosslinking degree between the co-crosslinking agent and the base rubber, thereby improving the resilience.

The filler is blended mainly as a specific gravity-adjusting agent used to adjust the specific gravity of the golf ball obtained as a final product to the range from 1.0 to 1.5. Fillers generally blended in a core of a golf ball may be used. Examples of the filler include: inorganic fillers (specifically zinc oxide, barium sulfate, calcium carbonate, and the like); high-specific gravity metal powders (such as tungsten powder, molybdenum powder, and the like) ; and mixtures thereof. Particularly preferably used is zinc oxide, which can serve also as a vulcanizing assistant. When zinc oxide is used, the amount thereof is preferably 3 to 30 parts by mass, and more preferably 10 to 25 parts by mass based on 100 parts by mass of the base rubber. When the amount is smaller than 3 parts by mass, the above-mentioned specific gravity adjustment becomes difficult, and the ball weight possibly becomes too small. When the amount is larger than 30 parts by mass, the amount of the co-crosslinking agent to be blended such as the aforementioned zinc acrylate needs to be decreased for a suitable hardness of the resulting golf ball, and hence the ball may fail to exhibit high resilience.

In the present invention, the rubber composition includes a disulfide compound represented by the following formula (I) as an organic sulfur compound.

$$R^1\text{—}S\text{—}S\text{—}R^2 \quad (I)$$

In the formula (I), $R^1$ and $R^2$ each represent any one of the following groups: an aromatic hydrocarbon group; an aliphatic hydrocarbon group having two or more carbon atoms; a heterocyclic hydrocarbon group; and an alicyclic hydrocarbon group, each of which is optionally substituted with a substituent, and $R^1$ is a group different from $R^2$.

In the present invention, the rubber composition includes a disulfide compound including different hydrocarbon groups as $R^1$ and $R^2$, i.e., an asymmetric disulfide compound including different hydrocarbon groups as two groups bonded to the S atom of the disulfide. Accordingly, the resulting golf ball can exhibit a resilience performance higher than (at least equivalent to) that exhibited by balls prepared using a symmetric organic sulfur compound (a disulfide compound including the same hydrocarbon groups as $R^1$ and $R^2$ in the formula (I) (e.g., bis(pentabromophenyl)disulfide)). Simultaneously, use of such an asymmetric disulfide compound allows a suitable hardness of the resulting golf ball. Accordingly, the resulting solid golf ball can exhibit an excellent flight performance and give an excellent shot feeling.

Highly-symmetric disulfide compounds are high in crystallinity and low in solubility. In contrast, the asymmetric disulfide compound used in the present invention shows a reduced crystallinity and a higher solubility. This is presumably why the resulting golf ball of the present invention exhibits an improved resilience performance.

$C_{6-18}$ groups are mentioned as the aromatic hydrocarbon group of $R^1$ and $R^2$, and may be optionally substituted. Specific examples thereof include the following groups each of which is optionally substituted on the aromatic ring: aryl groups such as a phenyl group, a tolyl group, a xylyl group, a biphenyl group, an o-terphenyl group, a naphthyl group, an anthryl group, and a phenantolyl group; and aralkyl groups such as a benzyl group and a phenethyl group. Straight or branched $C_{2-20}$ groups may be used as the aliphatic hydrocarbon group having 2 or more carbon atoms, and may be optionally substituted. Specifically mentioned are the following groups each of which is optionally substituted: $C_{2-20}$ alkyl groups such as an ethyl group, an n-propyl group, an isopropyl group, an n-butyl group, an isobutyl group, a sec-butyl group, a tert-butyl group, a pentyl group, a hexyl group, a heptyl group, an octyl group, a nonyl group, a decyl group, an undecyl group, and a dodecyl group; and $C_{2-20}$ alkenyl groups such as a vinyl group, a propenyl group, an allyl group, a hexenyl group, and an octenyl group. $C_{3-18}$ groups are mentioned as the heterocyclic hydrocarbon group, and may be optionally substituted. Specifically, used may be the following groups each of which is optionally substituted: a furyl group, a thienyl group, a thiazolyl group, a benzofuryl group, a benzothiophenyl group, a benzothiazolyl group, a benzoxazolyl group, a pyridyl group, and a quinolyl group. $C_{3-14}$ groups are mentioned as the alicyclic hydrocarbon group, and may be optionally substituted. Specific examples thereof include a cyclopropyl group, a cyclobutyl group, a cyclopentyl group, a cyclohexyl group, a cyclopentenyl group, and a cyclohexenyl group. Among these, in view of the resilience performance, optionally substituted aromatic hydrocarbon groups and optionally substituted aliphatic hydrocarbon groups having two or more carbon atoms are preferable.

Among the above-mentioned disulfide compounds, preferred is an asymmetric compound in which $R^1$ is an optionally substituted aromatic hydrocarbon group, $R^2$ is an optionally substituted aliphatic hydrocarbon group having two or more carbon atoms, and $R^1$ is a group different from $R^2$. More preferred is an asymmetric compound in which $R^1$ is a substituted aromatic hydrocarbon group, $R^2$ is an optionally substituted aliphatic hydrocarbon group having two or more carbon atoms, and $R^1$ is a group different from $R^2$.

In these cases, the resulting golf ball can attain a desired hardness and show an improved resilience performance.

As such an asymmetric disulfide compound, a compound represented by the following formula (II) is suitably used, for example.

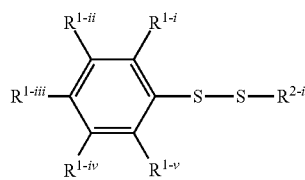

(II)

In the formula (II) $R^{1-i}$ to $R^{1-v}$ may be the same as or different from one another and each represent H or a substituent, and at least one of $R^{1-i}$ to $R^{1-v}$ is a substituent; and $R^{2-i}$ represents an optionally substituted aliphatic hydrocarbon group having two or more carbon atoms.

In the above formula (II), the substituents $R^{1-i}$ to $R^{1-v}$ are, for example, electron attractive substituents. The electron attractive substituent is a substituent having a Hammett substituent constant σ-value of more than zero. Examples thereof include: halogen atom-containing groups, e.g., halogen groups (such as a chloro group, a bromo group, an iodo group, and a fluoro group) and trihalomethyl groups (such as a trifluoromethyl group, a tribromomethyl group, and a trichloromethyl group); carboxylic acid groups; carboxylic acid ester groups; a cyano group; an amide group; a nitro group; an acetyl group; and a formyl group. These substituents may be introduced singly or in a combination of two or more species thereof. In view of the resilience performance, preferred are halogen groups, trihalomethyl groups, carboxylic acid ester groups, a cyano group, and an acetyl group, and more preferred are halogen groups and trihalomethyl groups. Organic sulfur compounds that are substituted with a halogen group or a trihalomethyl group and have a large number of substituents can effectively improve the resilience performance.

As $R^{2-i}$ in the formula (II), which is an optionally substituted aliphatic hydrocarbon group having two or more carbon atoms, the groups as mentioned for the aliphatic hydrocarbon group of $R^1$ and $R^2$ may be used.

Specific examples of the disulfide compound represented by the formula (II) include: monohalophenyl-ethyl-disulfides such as 2-chlorophenyl-ethyl-disulfide, 3-chlorophenyl-ethyl-disulfide, 4-chlorophenyl-ethyl-disulfide, 2-bromophenyl-ethyl-disulfide, 3-bromophenyl-ethyl-disulfide, and 4-bromophenyl-ethyl-disulfide; dihalophenyl-ethyl-disulfides such as 2,4-dichlorophenyl-ethyl-disulfide, 3,5-dichlorophenyl-ethyl-disulfide, 2,4-dibromophenyl-ethyl-disulfide, 3,5-dibromophenyl-ethyl-disulfide, (2-chloro-4-bromophenyl)-ethyl-disulfide, and (3-chloro-5-bromophenyl)-ethyl-disulfide; trihalophenyl-ethyl-disulfides such as 2,4,6-trichlorophenyl-ethyl-disulfide, 2,4,6-tribromophenyl-ethyl-disulfide, and (2,6-dichloro-4-bromophenyl)-ethyl-disulfide; tetrahalophenyl-ethyl-disulfides such as 2,3,5,6-tetrachlorophenyl-ethyl-disulfide, 2,3,5,6-tetrabromophenyl-ethyl-disulfide, and (2,6-dichloro-3,5-dibromophenyl)-ethyl-disulfide; and pentahalophenyl-ethyl-disulfides such as 2,3,4,5,6-pentachlorophenyl-ethyl-disulfide, 2,3,4,5,6-pentabromophenyl-ethyl-disulfide, and (2,4,6-trichloro-3,5-dibromophenyl)-ethyl-disulfide. Halophenyl-alkyl-disulfides, including halophenyl-propyl-disulfides, halophenyl-butyl-disulfides, halophenyl-pentyl-disulfides, halophenyl-hexyl-disulfides, and halophenyl-heptyl-disulfides, which correspond to the above-mentioned compounds, may be also used.

As the compound represented by the above formula (I), the following asymmetric compound is also used suitably: each of $R^1$ and $R^2$ represents an optionally substituted aromatic hydrocarbon group, and $R^1$ is a group different from $R^2$. More suitably used is an asymmetric compound in which each of $R^1$ and $R^2$ is a substituted aromatic hydrocarbon group, and $R^1$ is a group different from $R^2$. In these cases, the resulting golf ball can attain a desired hardness and show an improved resilience performance.

As such an asymmetric disulfide compound, a compound represented by the following formula (III) is suitably used, for example.

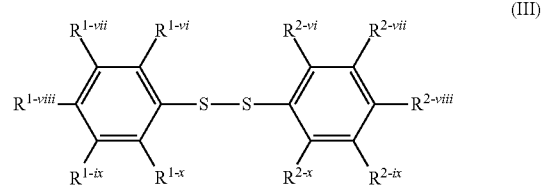

(III)

In the formula (III), to $R^{1-vi}$ may be the same as or different from one another and each represent H or a substituent, and at least one of $R^{1-vi}$ to $R^{1-x}$ is a substituent; $R^{2-vi}$ to $R^{2-x}$ may be the same as or different from one another and each represent H or a substituent, and at least one of $R^{2-vi}$ to $R^{2-x}$ is a substituent; and the phenyl group having the substituents $R^{1-vi}$ to $R^{1-x}$ is different from the phenyl group having the substituents $R^{2-vi}$ to $R^{2-x}$.

The groups as mentioned for the substituents $R^{1-i}$ to $R^{1-v}$ may be used as each of the substituents $R^{1-vi}$ to $R^{1-x}$ and the substituents $R^{2-vi}$ to $R^{2-x}$ in the formula (III).

Specific examples of the disulfide compound represented by the formula (III) include the following compounds: monohalophenyl-2,3,4,5,6-pentachlorophenyl-disulfides such as 2-chlorophenyl-pentachlorophenyl-disulfide, 3-chlorophenyl-pentachlorophenyl-disulfide, 4-chlorophenyl-pentachlorophenyl-disulfide, 2-bromophenyl-pentachlorophenyl-disulfide, 3-bromophenyl-pentachlorophenyl-disulfide, and 4-bromophenyl-pentachlorophenyl-disulfide; dihalophenyl-2,3,4,5,6-pentachlorophenyl-disulfides such as 2,4-dichlorophenyl-pentachlorophenyl-disulfide, 3,5-dichlorophenyl-pentachlorophenyl-disulfide, 2,4-dibromophenyl-pentachlorophenyl-disulfide, 3,5-dibromophenyl-pentachlorophenyl-disulfide, (2-chloro-4-bromophenyl)-pentachlorophenyl-disulfide, and (3-chloro-5-bromophenyl)-pentachlorophenyl-disulfide; trihalophenyl-2,3,4,5,6-pentachlorophenyl-disulfides such as 2,4,6-trichlorophenyl-pentachlorophenyl-disulfide, 2,4,6-tribromophenyl-pentachlorophenyl-disulfide, and (2,6-dichloro-4-bromophenyl)-pentachlorophenyl-disulfide; tetrahalophenyl-2,3,4,5,6-pentachlorophenyl-disulfides such as 2,3,5,6-tetrachlorophenyl-pentachlorophenyl-disulfide, 2,3,5,6-tetrabromophenyl-pentachlorophenyl-disulfide, and (2,6-dichloro-3,5-dibromophenyl)-pentachlorophenyl-disulfide; and pentahalophenyl-2,3,4,5,6-pentachlorophenyl-disulfides (asymmetry) such as pentabromophenyl-pentachlorophenyl-disulfide, and (2,4,6-trichloro-3,5-dibromophenyl)-pentachlorophenyl-disulfide. Halophenyl-2,3,4,5,6-pentabromophenyl-disulfides corresponding to the above-mentioned compounds may also be used. Further, used may be other asymmetric compounds such as 2-chlorophenyl-(2,4,6-trichloro-3,5-dibromophenyl)-disulfide, and 2,4-dichlorophenyl-(2,4,6-trichloro-3,5-dibromophenyl)-disulfide. The disulfide compounds may be used alone or in a combination of two or more species thereof.

Conventionally, novel SS compounds are synthesized by, for example, a method including using a compound originally having a —SS— structure (e.g., diphenyl disulfide) as the raw material and modifying the substituent. However, this method has a limitation in synthesizing a novel SS compound with an asymmetric set of substituents or an asymmetric structure. The asymmetric disulfide compound used in the present invention, namely, the sulfur compound represented by the above formula (I), can be synthesized by, for example, a method of subjecting a SH compound to oxidation treatment in the presence of iodine, thereby converting it into a SS form. Use of such a method allows preparation of various SS compounds having a wider range of combinations than before.

Specifically, these SS compounds can be synthesized and separated by the following method, for example.

Two different thiol compounds are dissolved into a methanol solution and the mixture is stirred enough. Thereinto, a separately-prepared 20% by mass aqueous solution of $KI/I_2$ is added dropwise under stirring, and the dropwise addition is stopped when the brown color of the iodine can no longer be recognized by eye. After completion of the reaction, the reaction product is separated by filtration to yield a solid sample (containing a SS-form), and this sample is fed into a column to be separated again, thereby yielding only a desired substance. This desired substance in a specific amount is blended into the rubber composition.

The amount of the disulfide compound represented by the formula (I) to be blended is preferably 0.05 to 3.0 parts by mass, and more preferably 0.1 to 2.0 parts by mass based on 100 parts by mass of the base rubber. When the amount of the disulfide compound is smaller than 0.05 parts by mass, the disulfide compound may insufficiently exhibit the effect of improving the resilience. When the amount is larger than 3.0 parts by mass, the compressive deformation amount of the core becomes large, possibly resulting in lowered resilience of the resulting golf ball.

The rubber composition used for the core of the golf ball of the present invention may further include an age resistor, a peptizing agent, and any other ingredients that can be usually used for preparing the core of a solid golf ball. The age resistor is preferably used in an amount of 0.2 to 0.5 parts by mass based on 100 parts by mass of the base rubber.

The rubber composition as described above is kneaded homogeneously with an appropriate kneader such as a mixing roll and then vulcanization-molded in a mold to obtain the core. Although the conditions of the vulcanization-molding are not particularly limited, the vulcanization-molding is usually performed at a temperature ranging from 130 to 240° C. and a pressure ranging from 2.9 to 11.8 MPa, and for 15 to 60 minutes.

The deformation amount of the core of the golf ball in the present invention is preferably in the range of 2.0 to 6.0 mm, and more preferably 2.8 to 4.5 mm when applying a load from 98 N as an initial load to 1275 N as a final load to the core. When the deformation amount of the core is smaller than 2.0 mm, the core may be too hard, possibly resulting in poor shot feeling of the resulting golf ball. When the deformation amount is larger than 6.0 mm, the core may be too soft, with the result that the resulting golf ball may have lowered durability and exhibit poor resilience, hence, a shorter flight distance.

In the present invention, the diameter of the core is preferably 32.8 to 40.8 mm, and more preferably 33.6 to 40.0 mm. When the diameter of the core is smaller than 32.8 mm, the resilience of the resulting golf ball may be lowered, possibly resulting in a shorter flight distance. When the diameter is larger than 40.8 mm, the cover becomes too thin, with the result that the durability of the resulting golf ball may be lowered.

The core used in the golf ball of the present invention may have a single-layer structure or a multi-layered structure composed of two or more layers. It is preferable that the core portion made from the above-mentioned composition is set to occupy 30% or more, preferably 50% or more, more preferably 70% or more, and still more preferably 100%, of the entire volume of the core. The thus-obtained core is then covered with the cover.

The cover used in the golf ball of the present invention may have a single-layer structure or a multi-layered structure composed of two or more layers. The cover preferably contains, as a base resin, a thermoplastic resin, particularly an ionomer resin which is commonly used for covers of golf balls. Examples of the ionomer resin include a copolymer of ethylene and α,β-unsaturated carboxylic acid, in which at least a part of the carboxyl groups is neutralized with a metal ion, and a terpolymer of ethylene, α,β-unsaturated carboxylic acid, and α,β-unsaturated carboxylic acid ester, in which at least a part of the carboxyl groups is neutralized with a metal ion. Examples of the α,β-unsaturated carboxylic acid include acrylic acid, methacrylic acid, fumaric acid, maleic acid, and crotonic acid. Among them, acrylic acid and methacrylic acid are particularly preferable. Examples of the α,β-unsaturated carboxylic acid ester include methyl ester, ethyl ester, propyl ester, n-butyl ester, and isobutyl ester of acrylic acid, methacrylic acid, fumaric acid, maleic acid, or the like. Particularly, acrylic acid esters and methacrylic acid esters are preferable. Examples of the metal ion for neutralizing at least a part of the carboxyl groups in the copolymer of ethylene and α,β-unsaturated carboxylic acid or in the terpolymer of ethylene, α,β-unsaturated carboxylic acid, and α,β-unsaturated carboxylic acid ester include a sodium ion, a potassium ion, a lithium ion, a magnesium ion, a calcium ion, a zinc ion, a barium ion, an aluminum ion, tin ions, a zirconium ion, and a cadmium ion. Among them, a sodium ion, a zinc ion, and a magnesium ion are often used and preferred in view of the resilience, durability, and the like of the resulting golf ball.

The above-mentioned ionomer resin may be used singly as a preferable material for the cover. Alternatively, the ionomer resin may be used in combination with one or more species of thermoplastic elastomers, diene block copolymers and the like. Examples of the thermoplastic elastomers include polyamide thermoplastic elastomers, polyester thermoplastic elastomers, and polyurethane thermoplastic elastomers. The diene block copolymer is a block copolymer or a partially hydrogenated block copolymer which has a double bond derived from a conjugated diene compound.

The cover used in the present invention may, if needed, include a filler similar to that used in the core and various additives in addition to the above-mentioned resins. Examples of the various additives include pigments such as titanium dioxide, dispersants, age resistors, ultraviolet absorbers, and light stabilizers.

The method for covering the core with the cover is not particularly limited, and a common method for covering a core with a cover can be employed. Typically employed is a method including previously molding a cover composition into hemispherical half shells, covering a core with the two half shells, and subjecting the core with the shells to the pressure molding at a temperature of 130 to 170° C. for 1 to 5 minutes, or a method including injection-molding a cover composition directly onto a core to cover it.

The cover preferably has a thickness in the range of 1.0 to 5.0 mm, more preferably in the range of 1.4 to 4.6 mm, and still more preferably in the range of 1.4 to 2.5 mm. When the thickness is smaller than 1.0 mm, the cover may be too thin, possibly resulting in lowered durability and lowered resilience performance of the resulting golf ball. When the thickness is larger than 5.0 mm, the resulting golf ball possibly gives a poor shot feeling.

If needed, the surface of the golf ball may be provided with dimples upon molding the cover, and may be subjected to paint finishing, stamping, and the like after molding the cover.

EXAMPLES

The present invention will be specifically described based on examples; however, the present invention is not limited thereto.

<Test Method>
(1) Compressive Deformation Amount of Core (mm)

The deformation amount in the compression direction (compression amount in the compression direction) was measured when applying a load from 98 N as an initial load to 1275 N as a final load to the core. Then, the deformation amount was expressed by an index based on the deformation amount for the composition A-1 (Comparative Example) regarded as 100.

(2) Coefficient of Restitution of Core

A metal cylinder having a weight of 198.4 g was allowed to collide with each core at 40 m/sec. The speeds before and after the collision were measured for each of the cylinder and the core. The coefficient of restitution of each core was calculated based on the respective speeds measured in view of the respective mass of the cylinder and the core. The measurement was performed 12 times for each core and the averaged value was taken as a coefficient of restitution of each core. Then, the coefficient of restitution was expressed by a resilience index based on the coefficient of restitution for the composition A-1 (Comparative Example) regarded as 100.

(3) Shot Feeling

The hitting test was carried out by actually hitting each of the golf balls by ten golfers using a #1 wood club (a Driver, W#1, NewBreed Tour Forged manufactured by SUMITOMO RUBBER INDUSTRIES, LTD., loft angle:)8.5°). The shot feeling of each golf ball was evaluated in terms of the magnitude of the impact of the shot. The evaluation grade given by the largest number of the golfers was determined as the result of the shot feeling of the golf ball. The criteria for the grades are as follows.

Criteria for Grades

Excellent: The impact of the shot was very small, and the shot feeling was very soft and good.
Good: The impact of the shot was small, and the shot feeling was soft and good.
Fair: The impact of the shot was in an ordinary level.
Poor: The impact of the shot was large, and the shot feeling was bad.

(Preparation 1 of Asymmetric Disulfide Compound (Formula (II))

2,3,4,5,6-Pentachlorobenzenethiol and 1-hexylthiol were dissolved into a methanol solution, and then the mixture was stirred enough. Thereinto, a separately-prepared 20% by mass aqueous solution of $KI/I_2$ was added dropwise under stirring, and the dropwise addition was stopped when the brown color of the iodine could no longer be recognized by eye. After completion of the reaction, the reaction product was separated by filtration to yield a solid sample (containing a SS-form), and this sample was fed into a column to be separated again, thereby yielding 2,3,4,5,6-pentachlorophenyl-hexyl-disulfide.

(Preparation 2 of Asymmetric Disulfide Compound (Formula (III))

4-Chlorobenzenethiol and 2,3,4,5,6-pentachlorobenzenethiol were dissolved into a methanol solution, and then the mixture was stirred enough. Thereinto, a separately-prepared 20% by mass aqueous solution of $KI/I_2$ was added dropwise under stirring, and the dropwise addition was stopped when the brown color of the iodine could no longer be recognized by eye. After completion of the reaction, the reaction product was separated by filtration to yield a solid sample (containing a SS-form), and this sample was fed into a column to be separated again, thereby yielding 4-chlorophenyl-2,3,4,5,6-pentachlorophenyl-disulfide.

Examples and Comparative Examples (1) Preparation of Cover Composition

Materials for the cover composition shown in the following Table 1 were mixed with a twin-screw kneading extruder to prepare a cover composition in a pellet form, in the following extruding conditions:
screw diameter=45 mm,
screw revolutions=200 rpm, and
screw L/D=35.

Here, the mixture was heated at 150 to 230° C. in the die of the extruder.

TABLE 1

| Material for cover composition | Amount (part by mass) |
| --- | --- |
| HIMILAN 1706 | 30 |
| HIMILAN 1707 | 30 |
| HIMILAN 1605 | 40 |
| Titanium dioxide | 2 |
| Barium sulfate | 2 |

The resin materials used for the cover composition are as follows.

HIMILAN 1706: an ionomer resin of a zinc ion-neutralized ethylene-methacrylic acid copolymer, available from MITSUI-DUPONT POLYCHEMICALS CO.

HIMILAN 1707: an ionomer resin of a sodium ion-neutralized ethylene-methacrylic acid copolymer, available from MITSUI-DUPONT POLYCHEMICALS CO.

HIMILAN 1605: an ionomer resin of a sodium ion-neutralized ethylene-methacrylic acid copolymer, available from MITSUI-DUPONT POLYCHEMICALS CO.

(2) Preparation of Core

Rubber compositions for a core were prepared by kneading materials shown in the following Tables 2 (Examples) and 3 (Comparative Examples), and in Tables 4 (Examples) and 5 (Comparative Examples). Each of the obtained rubber compositions was pressed in a mold at 170° C. for a maximum of 200 minutes to obtain a core with a diameter of 40.4 mm.

The obtained cores were measured for compressive deformation amount and coefficient of restitution. The results are shown in Tables 2 and 3, and in Tables 4 and 5.

The butadiene rubber used in each rubber composition for a core was a high-cis polybutadiene rubber (BR730, cis content: 96% or higher) produced by JSR CORPORATION. The zinc acrylate used therein was Sanceler SR (zinc acrylate produced by SANSHIN CHEMICAL INDUSTRY CO., LTD., purity: 90%). The DCP used therein was dicumyl peroxide produced by NOF CORPORATION.

(3) Preparation of Golf Ball

Subsequently, the obtained cores were each covered with a cover layer by injection-molding the above-mentioned cover composition onto the core, and then coated on the surface with a paint to obtain two-piece solid golf balls with an outer diameter of 42.7 mm.

The obtained golf balls were evaluated for shot feeling, and the results are shown in Tables 2 (Examples) and 3 (Comparative Examples), and in Tables 4 (Examples) and 5 (Comparative Examples).

TABLE 2

| | | | Examples | | |
|---|---|---|---|---|---|
| | | | Compositions | | |
| | | | 1-1 | 1-2 | 1-3 |
| Core composition | BR730 | | 100 | 100 | 100 |
| | Zinc acrylate | | 27.5 | 27.5 | 27.5 |
| | Zinc oxide | | 20.0 | 20.0 | 20.0 |
| | Pentachlorophenyl-hexyl-disulfide | | 0.21 | 0.21 | 0.21 |
| | DCP | | 0.7 | 1.1 | 1.5 |
| Evaluation of core physical properties | Measured value | Compressive deformation amount (mm) | 4.12 | 4.01 | 3.85 |
| | | Coefficient of restitution | 0.7956 | 0.7970 | 0.7989 |
| | Index | Compressive deformation amount (index) | 95.83 | 93.27 | 89.55 |
| | | Resilience (index) | 102.78 | 102.96 | 103.20 |
| Shot feeling | | | Good | Good | Good |

TABLE 3

| | | | Comparative Examples | | | | | |
|---|---|---|---|---|---|---|---|---|
| | | | Compositions | | | | | |
| | | | A-1 | A-2 | A-3 | B-1 | B-2 | B-3 |
| Core composition | BR730 | | 100 | 100 | 100 | 100 | 100 | 100 |
| | Zinc acrylate | | 27.5 | 27.5 | 27.5 | 27.5 | 27.5 | 27.5 |
| | Zinc oxide | | 20.0 | 20.0 | 20.0 | 20.0 | 20.0 | 20.0 |
| | Dihexyl disulfide | | — | — | — | 0.11 | 0.11 | 0.11 |
| | Bis(pentachlorophenyl)disulfide | | — | — | — | — | — | — |
| | DCP | | 0.2 | 0.3 | 0.4 | 0.7 | 1.0 | 1.3 |
| Evaluation of core physical properties | Measured value | Compressive deformation amount (mm) | 4.30 | 3.97 | 3.80 | 4.12 | 4.01 | 3.88 |
| | | Coefficient of restitution | 0.7741 | 0.7837 | 0.7860 | 0.7936 | 0.7941 | 0.7962 |
| | Index | Compressive deformation amount (index) | 100.00 | 92.30 | 88.34 | 95.83 | 93.27 | 90.25 |
| | | Resilience (index) | 100.00 | 101.24 | 101.53 | 102.52 | 102.58 | 102.86 |
| Shot feeling | | | Good | Good | Good | Good | Good | Good |
| | | | Compositions | | | | | |
| | | | C-1 | C-2 | C-3 | D-1 | D-2 | D-3 |
| Core composition | BR730 | | 100 | 100 | 100 | 100 | 100 | 100 |
| | Zinc acrylate | | 27.5 | 27.5 | 27.5 | 27.5 | 27.5 | 27.5 |
| | Zinc oxide | | 20.0 | 20.0 | 20.0 | 20.0 | 20.0 | 20.0 |
| | Dihexyl disulfide | | — | — | — | 0.05 | 0.05 | 0.05 |
| | Bis(pentachlorophenyl)disulfide | | 0.52 | 0.52 | 0.52 | 0.26 | 0.26 | 0.26 |
| | DCP | | 0.4 | 0.7 | 1.0 | 0.6 | 0.9 | 1.2 |

TABLE 3-continued

| | | | Comparative Examples | | | | | |
|---|---|---|---|---|---|---|---|---|
| Evaluation of core physical properties | Measured value | Compressive deformation amount (mm) | 4.21 | 4.06 | 4.02 | 4.11 | 3.93 | 3.77 |
| | | Coefficient of restitution | 0.7909 | 0.7950 | 0.7963 | 0.7928 | 0.7944 | 0.7951 |
| | Index | Compressive deformation amount (index) | 97.93 | 94.53 | 93.51 | 95.60 | 91.41 | 87.69 |
| | | Resilience (index) | 102.17 | 102.69 | 102.87 | 102.42 | 102.62 | 102.71 |
| Shot feeling | | | Good | Good | Good | Good | Good | Good |

FIG. 1 is a graph showing the relationship between the compressive deformation amount (index) and the resilience (index) of each core in Tables 2 and 3. Toward the upper right side of the graph, both of the shot feeling and the resilience (flight distance) of the golf ball become more excellent. The resilience of the golf balls is usually evaluated by comparing restitution coefficients of the golf balls showing the same compressive deformation amount. It was found that in the compositions 1-1 to 1-3 (Examples) in which an asymmetric disulfide compound, pentachlorophenyl-hexyl-disulfide, was used, the resilience performance was higher than in the compositions B-1 to B-3 and C-1 to C-3 (Comparative Examples) in which a symmetric compound, dihexyl disulfide or bis(pentachlorophenyl)disulfide, was used. Also in the compositions D-1 to D-3 (Comparative Examples) in which a mixture of two different symmetric compounds was used, the effects of the mixing were not observed.

The golf balls of Examples gave a good shot feeling to the users, and also could be expected to show a long flight distance since the cores showed a high resilience performance.

TABLE 4

| | | | Examples | | |
|---|---|---|---|---|---|
| | | | Compositions | | |
| | | | 2-1 | 2-2 | 2-3 |
| Core composition | BR730 | | 100 | 100 | 100 |
| | Zinc acrylate | | 27.5 | 27.5 | 27.5 |
| | Zinc oxide | | 20.0 | 20.0 | 20.0 |
| | 4-chlorophenyl-pentachlorophenyl-disulfide | | 0.39 | 0.39 | 0.39 |
| | DCP | | 0.7 | 1.1 | 1.5 |
| Evaluation of core physical properties | Measured value | Compressive deformation amount (mm) | 4.02 | 3.94 | 3.87 |
| | | Coefficient of restitution | 0.7985 | 0.7992 | 0.7994 |
| | Index | Compressive deformation amount (index) | 93.51 | 91.65 | 90.02 |
| | | Resilience (index) | 103.15 | 103.24 | 103.27 |
| Shot feeling | | | Good | Good | Good |

TABLE 5

| | | Comparative Examples | | | | | |
|---|---|---|---|---|---|---|---|
| | | Compositions | | | | | |
| | | A-1 | A-2 | A-3 | E-1 | E-2 | E-3 |
| Core composition | BR730 | 100 | 100 | 100 | 100 | 100 | 100 |
| | Zinc acrylate | 27.5 | 27.5 | 27.5 | 27.5 | 27.5 | 27.5 |
| | Zinc oxide | 20.0 | 20.0 | 20.0 | 20.0 | 20.0 | 20.0 |
| | Bis(4-chlorophenyl)disulfide | — | — | — | 0.27 | 0.27 | 0.27 |
| | Bis(pentachlorophenyl)disulfide | — | — | — | — | — | — |
| | DCP | 0.2 | 0.3 | 0.4 | 0.7 | 1.0 | 1.3 |
| Evaluation of core physical properties | Measured value Compressive deformation amount (mm) | 4.30 | 3.97 | 3.80 | 4.19 | 4.08 | 4.02 |
| | Coefficient of restitution | 0.7741 | 0.7837 | 0.7860 | 0.7832 | 0.7845 | 0.7848 |
| | Index Compressive deformation amount (index) | 100.00 | 92.30 | 88.34 | 97.50 | 94.79 | 93.60 |
| | Resilience (index) | 100.00 | 101.24 | 101.53 | 101.18 | 101.35 | 101.38 |
| Shot feeling | | Good | Good | Good | Good | Good | Good |

| | | Compositions | | | | | |
|---|---|---|---|---|---|---|---|
| | | C-1 | C-2 | C-3 | F-1 | F-2 | F-3 |
| Core composition | BR730 | 100 | 100 | 100 | 100 | 100 | 100 |
| | Zinc acrylate | 27.5 | 27.5 | 27.5 | 27.5 | 27.5 | 27.5 |
| | Zinc oxide | 20.0 | 20.0 | 20.0 | 20.0 | 20.0 | 20.0 |
| | Bis(4-chlorophenyl)disulfide | — | — | — | 0.13 | 0.13 | 0.13 |

TABLE 5-continued

| | | | Comparative Examples | | | | | |
|---|---|---|---|---|---|---|---|---|
| | Bis(pentachlorophenyl)disulfide | | 0.52 | 0.52 | 0.52 | 0.26 | 026 | 0.26 |
| | DCP | | 0.4 | 0.7 | 1.0 | 0.6 | 0.9 | 1.2 |
| Evaluation of core physical properties | Measured value | Compressive deformation amount (mm) | 4.21 | 4.06 | 4.02 | 4.15 | 4.12 | 4.07 |
| | | Coefficient of restitution | 0.7909 | 0.7950 | 0.7963 | 0.7850 | 0.7859 | 0.7861 |
| | Index | Compressive deformation amount (index) | 97.93 | 94.53 | 93.551 | 96.62 | 95.82 | 94.59 |
| | | Resilience (index) | 102.17 | 102.69 | 102.87 | 101.41 | 101.53 | 101.55 |
| Shot feeling | | | Good | Good | Good | Good | Good | Good |

Figure 2:
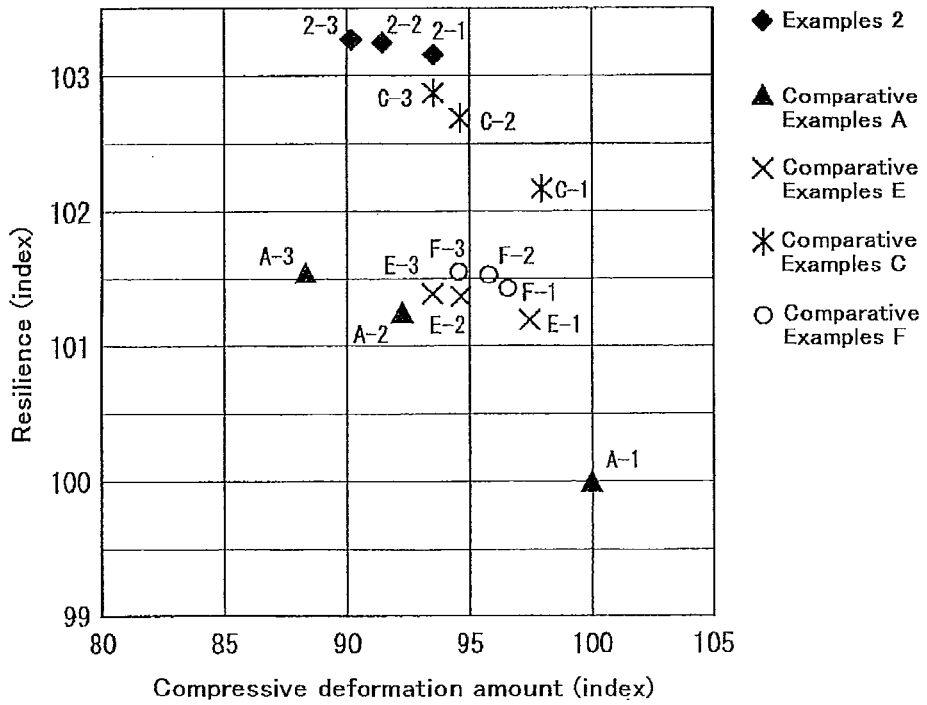
FIG. 2 is a graph showing the relationship between the compressive deformation amount (X-axis) and the coefficient of restitution (Y-axis) of the respective cores for a solid golf ball listed in Tables 4 and 5.

FIG. 2 is a graph showing the relationship between the compressive deformation amount (index) and the resilience (index) of each core in Tables 4 and 5.

In the Examples where 4-chlorophenyl-pentachlorophenyl-disulfide was used as an asymmetric disulfide compound, similarly to the Examples shown in FIG. 1, the cores exhibited a high resilience performance, and also the golf balls gave a good shot feeling to the users, and hence could be expected to show a long flight distance.

The invention claimed is:

1. A solid golf ball, comprising:
a core including at least one layer; and
a cover including at least one layer, the cover being provided to cover the core,
wherein the at least one layer of the core is prepared by vulcanization-molding a rubber composition,
the rubber composition comprising:
(a) a base rubber;
(b) a co-crosslinking agent;
(c) an organic peroxide;
(d) a filler; and
(e) a disulfide compound represented by the following formula (I):

wherein $R^1$ is an optionally substituted aromatic hydrocarbon group, $R^2$ is an optionally substituted aliphatic hydrocarbon group having four or more carbon atoms, and $R^1$ is a group different from $R^2$, or a compound represented by the following formula (III):

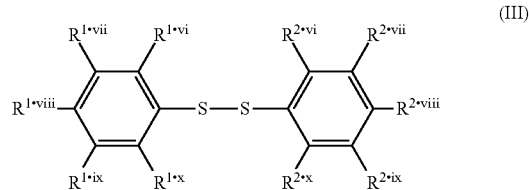

wherein, in the formula (III), $R^{1\text{-}vi}$ to $R^{1\text{-}x}$ may be the same as or different from one another and each represents H or a substituent, at least one of $R^{1\text{-}vi}$ to $R^{1\text{-}x}$ is a substituent, and at least one of the substituents is a halogen group or trihalomethyl group; $R^{2\text{-}vi}$ to $R^{2\text{-}x}$ may be the same as or different from one another and each represents H or a substituent, at least one of $R^{2\text{-}vi}$ to $R^{2\text{-}x}$ is a substituent, and at least one of the substituents is a halogen group or trihalomethyl group; and the phenyl group having $R^{1\text{-}vi}$ to $R^{1\text{-}x}$ is different from the phenyl group having $R^{2\text{-}vi}$ to $R^{2\text{-}x}$.

2. The solid golf ball according to claim 1, wherein the amount of the disulfide compound represented by the formula (I) is 0.05 to 3.0 parts by mass based on 100 parts by mass of the base rubber.

3. The solid golf ball according to claim 1, wherein the core has a diameter of 32.8 to 40.8 mm, and the deformation amount of the core is 2.0 to 6.0 mm when applying a load from 98 N as an initial load to 1275 N as a final load to the core.

* * * * *